US009403441B2

(12) United States Patent
Ashworth et al.

(10) Patent No.: US 9,403,441 B2
(45) Date of Patent: Aug. 2, 2016

(54) AUTONOMOUS MANAGEMENT OF DISTRIBUTION TRANSFORMER POWER LOAD (75) Inventors: Nicholas Ashworth, Medina, MN (US); Robert J. Cox, Plymouth, MN (US); Joseph E. Childs, Golden, CO (US)

(73) Assignee: Cooper Technologies Company, Houston, TX (US)

( * ) Notice: Subject to any disclaimer, the term of this patent is extended or adjusted under 35 U.S.C. 154(b) by 529 days.

(21) Appl. No.: 13/590,937

(22) Filed: Aug. 21, 2012

(65) Prior Publication Data
US 2014/0058575 A1 Feb. 27, 2014

(51) Int. Cl.
B60L 11/18 (2006.01)
G06F 1/26 (2006.01)
H01F 27/40 (2006.01)

(52) U.S. Cl.
CPC ........... *B60L 11/1844* (2013.01); *Y02E 60/721* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y04S 10/126* (2013.01)

(58) Field of Classification Search
CPC ..... B60L 11/1844; G06F 1/26; H01F 27/402; Y02E 60/721; Y02T 90/14; Y02T 90/128; Y02T 10/7005; Y02T 10/7072; Y02T 90/121; Y02T 90/16; Y02T 90/163; Y04S 10/126
USPC ........................................................ 700/297
See application file for complete search history.

(56) References Cited

U.S. PATENT DOCUMENTS

| | | | |
|---|---|---|---|
| 3,939,395 | A | 2/1976 | Prestridge et al. |
| 5,136,233 | A | 8/1992 | Klinkenberg et al. |
| 5,553,003 | A | 9/1996 | Harada et al. |
| 6,005,484 | A | 12/1999 | Ko |
| 6,512,966 | B2 | 1/2003 | Lof et al. |
| 6,545,482 | B1 | 4/2003 | Fedirchuk et al. |
| 6,581,104 | B1 | 6/2003 | Bereiter |
| 6,624,532 | B1 | 9/2003 | Davidow et al. |
| 6,711,512 | B2 | 3/2004 | Noh |

(Continued)

FOREIGN PATENT DOCUMENTS

WO WO 2010/077078 A2 7/2010

OTHER PUBLICATIONS

PCT/US2013/054048, filed Aug. 8, 2013, Search Report dated Nov. 27, 2013, 4 pages.

(Continued)

*Primary Examiner* — Robert Fennema
*Assistant Examiner* — Jennifer L Norton
(74) *Attorney, Agent, or Firm* — Patterson Thuente Pedersen, P.A.

(57) ABSTRACT

A load-managing electricity service (LMES) system for managing and controlling electricity-consuming loads supplied by a common distribution transformer. The LMES system includes: a communicative distribution transformer (CDT) sensor that includes a transceiver, a sensing circuit and a processor configured to determine whether a power load of the transformer exceeds an upper threshold. The LMES system also includes a load-control device (LCD) configured to communicate with the CDT sensor, and to selectively decrease or increase the power load of the distribution transformer by managing the electricity-consuming leads at consumer premises.

32 Claims, 6 Drawing Sheets

(56) References Cited

U.S. PATENT DOCUMENTS

| | | |
|---|---|---|
| 6,861,834 B2 | 3/2005 | Kronrod et al. |
| 6,906,630 B2 | 6/2005 | Georges et al. |
| 6,979,916 B2 | 12/2005 | Schienbein et al. |
| 7,218,998 B1 | 5/2007 | Neale |
| 7,355,301 B2 | 4/2008 | Ockert et al. |
| 7,479,045 B1 | 1/2009 | Biro et al. |
| 7,627,453 B2 | 12/2009 | Keefe et al. |
| 7,675,427 B2 | 3/2010 | Deaver, Sr. et al. |
| 7,701,357 B2 | 4/2010 | Deaver, Sr. et al. |
| 7,702,424 B2 | 4/2010 | Cannon et al. |
| 7,734,380 B2 | 6/2010 | Ransom et al. |
| 7,804,280 B2 | 9/2010 | Deaver, Sr. et al. |
| 7,869,904 B2 | 1/2011 | Cannon et al. |
| 7,880,343 B2 | 2/2011 | Kleinecke et al. |
| 7,965,193 B2 | 6/2011 | Deaver, Sr. et al. |
| 8,024,077 B2 | 9/2011 | Torre et al. |
| 8,154,246 B1 | 4/2012 | Heitmann |
| 8,232,765 B2 | 7/2012 | Billmaier |
| 8,239,068 B1 | 8/2012 | Rossi et al. |
| 8,384,359 B2* | 2/2013 | Narel et al. .......... 320/162 |
| 2004/0237555 A1 | 12/2004 | Andrews |
| 2004/0246085 A1 | 12/2004 | West |
| 2005/0036258 A1 | 2/2005 | Ma et al. |
| 2005/0207081 A1* | 9/2005 | Ying .................. 361/105 |
| 2006/0007016 A1 | 1/2006 | Borkowski et al. |
| 2007/0257764 A1 | 11/2007 | D'Agostino et al. |
| 2007/0271006 A1* | 11/2007 | Golden et al. ........ 700/295 |
| 2007/0299562 A1* | 12/2007 | Kates .................. 700/295 |
| 2008/0077336 A1* | 3/2008 | Fernandes .............. 702/57 |
| 2008/0265677 A1 | 10/2008 | Chiang et al. |
| 2009/0093916 A1 | 4/2009 | Parsonnet et al. |
| 2009/0222143 A1 | 9/2009 | Kempton |
| 2009/0261779 A1* | 10/2009 | Zyren ................. 320/109 |
| 2009/0265042 A1* | 10/2009 | Mollenkopf et al. ..... 700/298 |
| 2009/0281673 A1 | 11/2009 | Taft |
| 2009/0281679 A1* | 11/2009 | Taft et al. ............. 700/297 |
| 2010/0007336 A1 | 1/2010 | de Buda |
| 2010/0017249 A1 | 1/2010 | Fincham et al. |
| 2010/0079004 A1* | 4/2010 | Keefe ............. B60L 11/1842 307/80 |
| 2010/0109431 A1 | 5/2010 | West |
| 2010/0156649 A1 | 6/2010 | Deaver, Sr. et al. |
| 2010/0161481 A1 | 6/2010 | Littrell |
| 2010/0179704 A1 | 7/2010 | Ozog |
| 2010/0301833 A1 | 12/2010 | Foster |
| 2011/0095608 A1 | 4/2011 | Jonsson et al. |
| 2011/0101777 A1 | 5/2011 | Jansma |
| 2011/0109266 A1* | 5/2011 | Rossi ................. 320/109 |
| 2011/0241647 A1* | 10/2011 | Hershey et al. ......... 323/355 |
| 2012/0029717 A1 | 2/2012 | Cox et al. |
| 2012/0089268 A1 | 4/2012 | Torre et al. |
| 2012/0153896 A1 | 6/2012 | Rossi |
| 2012/0181985 A1 | 7/2012 | Lowenthal et al. |
| 2012/0229089 A1* | 9/2012 | Bemmel et al. ......... 320/109 |
| 2013/0179061 A1* | 7/2013 | Gadh et al. ............ 701/123 |
| 2015/0319803 A1* | 11/2015 | Hosny .............. G01R 21/00 702/60 |

OTHER PUBLICATIONS

PCT/US2013/054048, filed Aug. 8, 2013, International Preliminary Report on Patentability, dated Feb. 24, 2015, 9 pages.

* cited by examiner

AUTONOMOUS MANAGEMENT OF DISTRIBUTION TRANSFORMER POWER LOAD

FIELD OF THE INVENTION

The present invention relates generally to management and control of electrical loads.

More particularly, the present invention relates to management and control of electrical loads connected to a distribution transformer.

BACKGROUND OF THE INVENTION

Electricity generated by a power plant is transmitted across a high-voltage transmission network to distribution networks for distribution to local businesses and residences. The high-voltage power is reduced by a substation for transmission across a distribution network that includes a series of distribution lines and distribution transformers. Whether the distribution lines are carried overhead by power poles, or buried underground, the voltage of the transmitted electricity on the distribution lines is typically reduced by a distribution transformer at or near the business or residence. In a residential neighborhood, a single distribution transformer typically serves four to eight residences, with all electricity consumed by the four to eight residences being conducted through the same power distribution transformer.

The utility company supplying the electricity through the distribution network chooses an appropriately-sized distribution transformer based on typical power consumption of its customers in a particular area. If the distribution transformer is undersized in terms of its capacity to provide power to its connected residences and associated power-consuming devices, the transformer eventually fails, resulting in a temporary loss of power to those connected to the transformer, and eventual replacement of the existing transformer with a larger-capacity transformer.

This scenario is becoming more and more common with the proliferation of electric vehicles. While the use of commercial charging stations is becoming more common, owners of electric vehicles more typically charge their electric vehicles during the evening hours using charging stations located at their homes. Charging an electric vehicle consumes a relatively high amount of electricity in a relatively short period of time. Although the actual power consumed depends on the particular vehicle and the extent of charging required, some known electric vehicles may consume up to three times the electricity used by a typical residential household.

Regions having a high adoption rate of electric vehicles experience a "clustering" problem when multiple electric vehicles charge from a single distribution transformer. As more and more electric vehicles are added, more and more distribution transformers are operated beyond their rated capacity, and eventually must be replaced.

One solution to this clustering problem is to simply replace all existing distribution transformers with larger-capacity transformers in those cities, towns, or neighborhoods where the adoption rate of electric vehicles is known to be particularly high. Obviously though, this solution would be exceedingly costly and inefficient to implement.

Another solution is to replace existing distribution transformers with "smart" distribution transformers. One such solution is described in U.S. Pat. No. 8,024,077 to Torre et al. ("Torre"). Torre discloses a smart transformer that utilizes a balancing algorithm to determine a rating of the transformer, then either brings on additional generation if available, or sends an alarm to the utility company along with a busy signal to a customer, requesting that electrical loads be reduced. However, such a solution fails to provide an autonomous system that allows equitable sharing of available power resources amongst those loads sharing the distribution transformer.

SUMMARY OF THE INVENTION

In an embodiment, the claimed invention comprises a load-managing electricity service (LMES) system for managing and controlling electrical loads supplied by a common distribution transformer. The LMES system includes: a communicative distribution transformer (CDT) sensor, that includes: a transmitter configured to transmit a load-management data message over a local communication network; a sensing circuit configured to sense an operating characteristic of a distribution transformer supplying a plurality of electrical loads on a common electricity service network, the operating characteristic indicative of a power load of the distribution transformer; and a processor in electrical communication with the transceiver and the sensing circuit, the processor configured to determine whether the operating characteristic exceeds an upper threshold. The LMES system also includes a load-control device (LCD) configured to communicate with the CDT sensor. The LCD includes: a transceiver configured to receive the load-management data message; a load-sensing circuit configured to sense one of the plurality of electrical loads supplied by the distribution transformer; a control device configured to cause a reduction in electricity supplied to the electric load; and a processor in electrical communication with the transceiver, the load-sensing circuit and the control device, the processor responsive to the load-management data message to cause the control device to reduce electricity supplied to the electrical load, thereby decreasing the power load of the distribution transformer.

In another embodiment, the claimed invention comprises a communicative distribution transformer (CDT) sensor for use in a load-managing electricity service (LMES) system for managing and controlling electrical loads supplied by a common distribution transformer. The CDT includes: a transceiver configured to transmit a load-management data message over a local communication network; a sensing circuit configured to sense an operating characteristic of a distribution transformer supplying a plurality of electrical loads on a common electricity service network, the operating characteristic indicative of a power load of the distribution transformer; and a processor in electrical communication with the transceiver and the sensing circuit, the processor configured to determine whether the operating characteristic exceeds a threshold. The processor is configured to cause the transceiver to transmit the load-management data message to a load-control device (LCD) associated with one of the plurality of electrical loads, thereby causing the LCD to reduce an amount of electricity supplied to the electrical load to be reduced.

In another embodiment, the claimed invention includes a load-control device (LCD) for use in a load-managing electricity service (LMES) system for managing and controlling electrical loads supplied by a common distribution transformer. The LCD includes: a transceiver configured to receive a load-management data message transmitted from a communicative sensor associated with the distribution transformer; a load-sensing circuit configured to sense an electric load receiving power from the distribution transformer; a control device configured to cause a reduction in electricity supplied to the electric load; and a processor in electrical communication with the transceiver, the load-sensing circuit and the control device, the processor responsive to the load-management data message to cause the control device to reduce electricity supplied to the electrical load, thereby decreasing an overall power load of the distribution transformer.

In another embodiment, the claimed invention includes a method of controlling power to an electrical load receiving power from a communicative distribution transformer communicating with a load-control device (LCD) associated with the electrical load. The method includes: sensing an operating characteristic of the communicative distribution transformer, the operating characteristic being indicative of a power load of a communicative distribution transformer; detecting that the operating characteristic indicative of the power load of the communicative distribution transformer exceeds a threshold; transmitting a load-management data message over a local network to a first load-control device (LCD) controlling a first electrical load receiving power from the communicative distribution transformer; receiving the load-management data message at the first LCD; and reducing the amount of power received by the first electrical load in response to the received load-management data message.

In an embodiment, the present invention comprises a load-managing electricity service (LMES) system for managing and controlling electricity-consuming loads supplied by a common distribution transformer. The LMES system includes: a communicative distribution transformer (CDT) sensor that includes a transceiver configured to transmit a load-management data message over a local communication network; a sensing circuit configured to sense an operating characteristic of a distribution transformer supplying a plurality of electrical loads on a common electricity service network, the operating characteristic indicative of a power load of the distribution transformer; and a processor in electrical communication with the transceiver and the sensing circuit, the processor configured to determine whether the operating characteristic exceeds an upper threshold. The LMES system also includes a load-control device (LCD) configured to communicate with the CDT sensor, the LCD including: a transceiver configured to receive the load-management data message; a load-sensing circuit configured to sense an electric load associated with the distribution transformer; a switching device configured to open and close an electrical connection between an electricity-consuming load and its electricity source; and a processor in electrical communication with the transceiver, the load-sensing circuit and the switching device, the processor responsive to the load-management data message to cause the switching device to open and close the electrical connection, thereby decreasing and increasing the power load of the distribution transformer.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Figure 1:
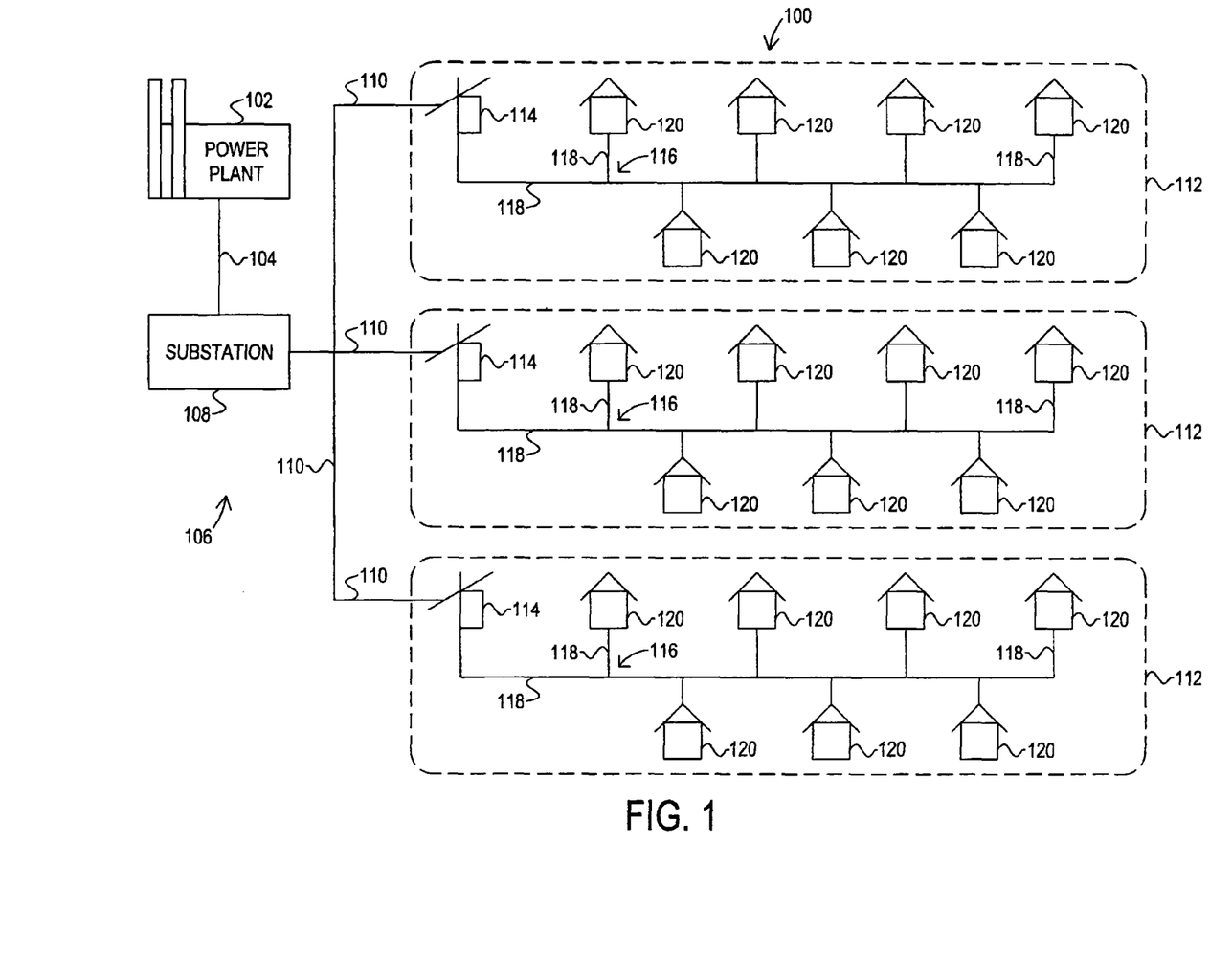
FIG. 1 is a diagram of an electricity grid transmitting and distributing electricity to groupings of local electricity-consuming premises through shared distribution transformers.

Referring to FIG. 1, in an embodiment, an electricity transmission and distribution grid 100 is depicted. Grid 100 includes a power plant, or electricity generation plant, 102, high-voltage transmission lines 104, and electricity distribution network 106. Power plant 102 generates electricity, transmits the electricity across a network of high-voltage transmission lines 104 to be distributed by distribution network 106.

Electricity distribution network 106, in an embodiment, includes one or more substations 108, distribution lines 110, and multiple electricity-service networks 112. Substations 108 receive the high-voltage electricity transmitted over transmission lines 104, and reduce the voltage of the electricity received over transmission lines 104, and transmit the reduced-voltage electricity over distribution lines 110 to local service networks 112 for further conditioning and distribution.

Each service network 112, in an embodiment, comprises distribution transformer 114, service line network 116 having multiple service lines 118, and one or more premises 120. A service network 112 serves a group of business, residences, or other such premise 120 by providing electricity having an appropriate voltage and frequency for use by electricity-consuming devices located at the premise, including electric vehicles, air-conditioning units, and other electrically-powered appliances. In an embodiment, each premise 120 is a residence, such as a single-family home. In other embodiments, a premise 120 may comprise an apartment building, commercial, or light industrial complex.

Figure 2:
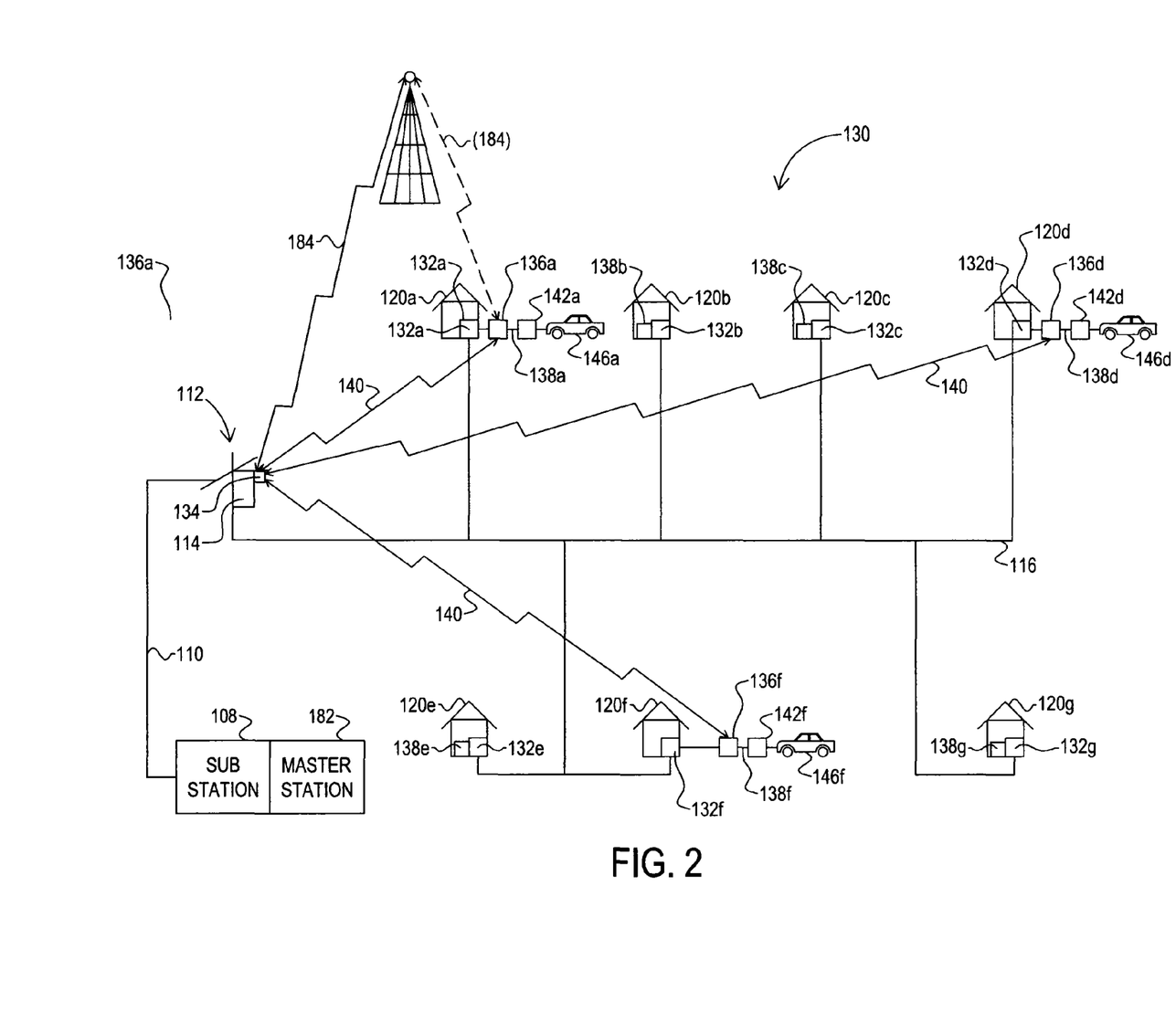
FIG. 2 is a diagram of an electricity distribution and communication network associated with one of the groupings of electricity-consuming premises, according to an embodiment of the claimed invention.

Referring to FIG. 2, an electricity service network 112 receiving electricity from substation 108 is configured to include autonomous load-management systems, devices, and methods of the claimed invention to form a load-managed electricity service (LMES) system 130. LMES system 130, in an embodiment, includes distribution transformer 114, service line network 116, premises 120 (including premises 120*a* to 120*g*) with electricity meters 132 (including meters 132*a* to 132*g*), comprising an electricity service network 112. LMES system 130 also includes communicative distribution transformer (CDT) sensor 134, load-control devices (LCDs) 136 (including LCD 136*a*, 136*d*, and 136*f*), electrical loads 138 (including loads 138*a* to 138*g*), and local communication network 140. In an embodiment, each electrical load 138, such as loads 138*a*, 138*d*, and 138*f*, comprises charging station 142 charging battery 144 (see FIG. 4) of an electric vehicle 146. In other embodiments, an electrical load 138, such as electrical loads 138*b*, 138*c*, 138*e*, and 138*g* may comprise an electrical appliance such as a compressor of an air-conditioning unit or other load like water heater, pool pump, or heat pump.

As depicted, distribution transformer 114 may be mounted on a power pole, but alternatively may be mounted on a ground pad, may be located underground, or may be located elsewhere. Distribution transformer 114 in an embodiment may comprise any known power distribution transformer used to condition power, typically by reducing its voltage, from a distribution line 110 and distribute it to premises 120 for consumption. Such known distribution transformers include transformers of varying voltages, phases, and construction. Examples include low- or medium voltage transformers, single or multi-phase transformers, liquid-immersed or dry transformers, and so on. In other embodiments, distribution transformer 114 may not be a known distribution transformer, but rather may include additional components of the claimed invention, such as communicative distribution transformer sensor 134, as described further below.

Each premise 120 typically includes an electricity meter 132, which may be supplied by a local electric utility company, and used to measure electricity consumption. Meter 132 may comprise a traditional meter, automated meter reading (AMR) or advanced metering infrastructure (AMI) meter, a smart meter having communication capabilities, or other such meter.

CDT sensor 134, described in further detail below with respect to FIG. 3, may be located at or near distribution transformer 114, sensing an electrical power load, or a parameter or characteristic indicative of the power load, on distribution transformer 114, and communicating with one or more LCD's 136. In an embodiment, CDT sensor 134 comprises a non-integral device, separate from distribution transformer 114. Such an embodiment may be used with an existing distribution transformer, such as in a retrofit situation. In another embodiment, CDT sensor 134 is integral to distribution transformer 114.

Figure 3:
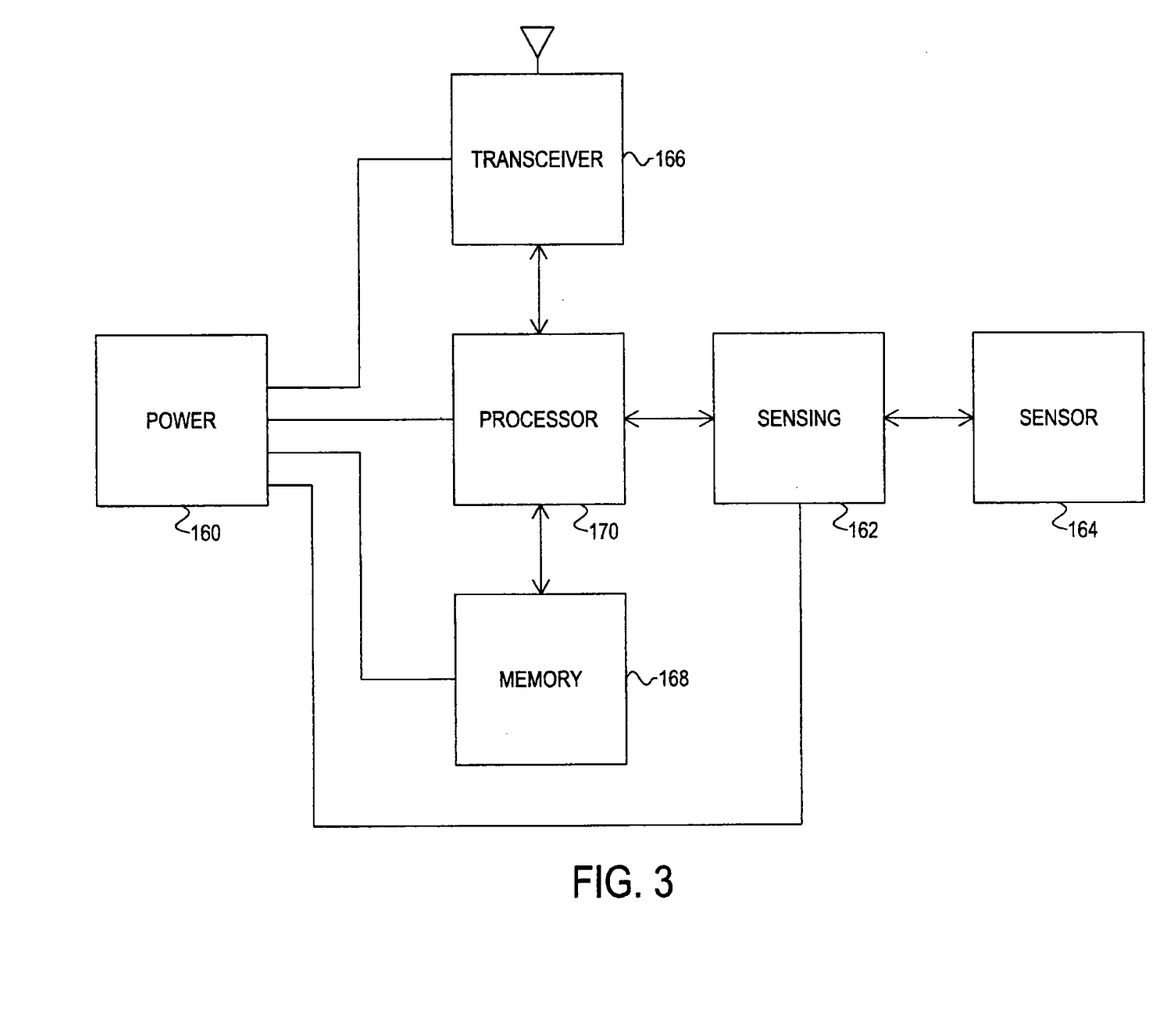
FIG. 3 is a block diagram of a communicative distribution transformer (CDT) sensor, according to an embodiment of the claimed invention.

Referring to FIG. 3, a block diagram of CDT sensor 134 is depicted. In an embodiment, CDT sensor 134 includes power supply and conditioning circuit 160, sensing circuit 162, sensor 164, transceiver 166, memory 168, and processor 170.

Power supply and conditioning circuit 160 supplies power to the various electrical circuits and components of CDT sensor 134. In an embodiment, power supply and conditioning circuit 160 is electrically connected to distribution transformer 114, such that distribution transformer 114 provides power to CDT sensor 134. In such an embodiment, power supply and conditioning circuit 160 may include a transformer (not depicted) to reduce a relatively high voltage to a relatively low voltage. Such a transformer may be integral to, or separate from, power supply and conditioning circuit 160. In an embodiment, the transformer may transform 120 VAC supplied from distribution transformer 114 to 5 VDC, or similar DC voltage, for use by the circuits of CDT sensor 134. However, it will be understood that power supply and conditioning circuit 160 may include other types of transformers appropriate for converting a particular electrical power available at distribution transformer 114 to an appropriate electrical power for use by CDT sensor 134.

In the embodiment depicted, power conditioning and supply circuit is electrically connected to sensing circuit 162, transceiver 166, memory 168, and processor 170, thereby providing power to CDT sensor 134.

Sensing circuit 162 is in electrical communication with sensor 164 and processor 170, and is configured to receive an input from sensor 164. In an embodiment, sensing circuit 162 and sensor 164 are individual, separate components, such that sensing circuit 162 may be commonly housed with processor 170 and other components of CDT sensor 134, while sensor 164 is located adjacent distribution transformer 114 and/or an electrical conductor of distribution transformer 114. Sensing circuit 162, in an embodiment, takes a raw data signal from sensor 164, conditions the data received, and provides it to processor 170 for analysis. In some embodiments, sensing circuit 162 may include its own processor for processing sensed data and information.

Sensor 164 may be a current sensor, power sensor, temperature or other sensor, such that sensor 164, or sensor 164 in combination with sensing circuit 162, senses power consumed by distribution transformer 114, current draw of distribution transformer 114, temperature of distribution transformer 114, or some other characteristic that is indicative of a load of distribution transformer 114.

In one such embodiment, sensor 164 comprises a current transformer attached to a distribution line, or other conductor feeding distribution transformer 114. Sensing circuit 162 receives current information from sensor 164 and provides data to processor 170 for further evaluation.

In another such embodiment, sensor 164 comprises a temperature sensor, such as a thermocouple. Sensing circuit 162 receives temperature data from sensor 164, and provides an indication of the detected temperature of distribution transformer 114 to processor 170. In other embodiments, sensor 164 may include multiple temperature sensors, or other types of sensors, such as current or temperature and current.

Transceiver 166 is in electrical communication with processor 170, and generally comprises short-haul (local) communications capability for communicating with nearby LCD's over a local communication network 140, as described further below. In some cases, transceiver 166 may also comprise long-haul capability for communicating with master station 182 over a long-haul communication network 184. As such, transceiver 166 may be configured for any combination of long-haul, short-haul, one-way, or two-way communications.

In one such embodiment, transceiver 166 comprises a combination transmitter and receiver configured for two-way communication over local network 140, and configured for one-way (transmit) communication over long-haul network 184. Alternatively, transceiver 166 may be configured for two-way communication over long-haul network 184.

In another embodiment, transceiver 166 comprises only a transmitter, and does not comprise a receiver. In this embodiment transmitter 166 may be configured to transmit information, data, and commands over local communication network 140, and in some embodiments, also over long-haul communication network 184. In such an embodiment CDT sensor 164 may act as a sort of overload sensor, sending out a duty cycle message to one or more LCDs 136 and/or charging stations 142. LCDs 136 and/or charging stations 142, in such an embodiment, may be in communication with each other to allow coordinated switching or duty cycling.

While FIG. 2 depicts local communication network 140 and long-haul communication network 184 as wireless networks, it will be understood that communication networks 140 and 184 may be wired networks, or a combination of wired and wireless networks.

As such, local communication network 140 may comprise a wireless network such as a wireless local area network (WLAN) or wireless mesh network. Local communication network 140 may accordingly utilize any of number of known network protocols and standards such as Wi-Fi, Bluetooth, ZigBee, or other proprietary and non-proprietary technology.

Local communication network 140 may also comprise a wired network. In an embodiment, network 140 is a power-line carrier (PLC) network that may include data transmission over service line network 116.

Long-haul communication network 184 may utilize wired or wireless communications, telephonic communications, Internet Protocol-based communications, satellite system-based communications, and the like. Examples of suitable communications systems include 900 MHz FLEX Paging, 154 MHz VHF Paging, wireless mesh network (WMN), and PLC.

If meter 132 is a smart meter, or otherwise includes local or long-haul communication capabilities, any of LCDs 136 or CDT sensor 134 may coordinate communications through one or more meters 132. In one such embodiment, a Zigbee-enabled meter 132 communicates with an LCD 136 at a common premise 120, as well as CDT sensor 134, over local communication network 140. A meter 132 may also provide a long-haul link to master station 182, such as through an RF long-haul network 184, on behalf of CDT sensor 134.

Processor 170 may comprise a microprocessor, microcontroller, microcomputer, or any suitable logic controller capable of performing calculations on measured data, reading from and writing to memory 168, and controlling electrical components such as transceiver 166 and sensing circuit 162 with sensor 164.

Memory 168 may comprise EEPROM or other suitable non-volatile computer readable memory capable of storing software algorithms and data including current, voltage, power, temperature, and other such data. Alternatively, memory 168 may also comprise volatile computer-readable memory, or a combination of volatile and non-volatile computer-readable memory in certain embodiments. Such embodiments include non-transitory, computer-readable storage mediums storing instructions to be implemented by processor 130 and CDT sensor 134. Memory 168 may also include a database for storing data sensed, measured, received, and so on, by CDT sensor 134.

Figure 4:
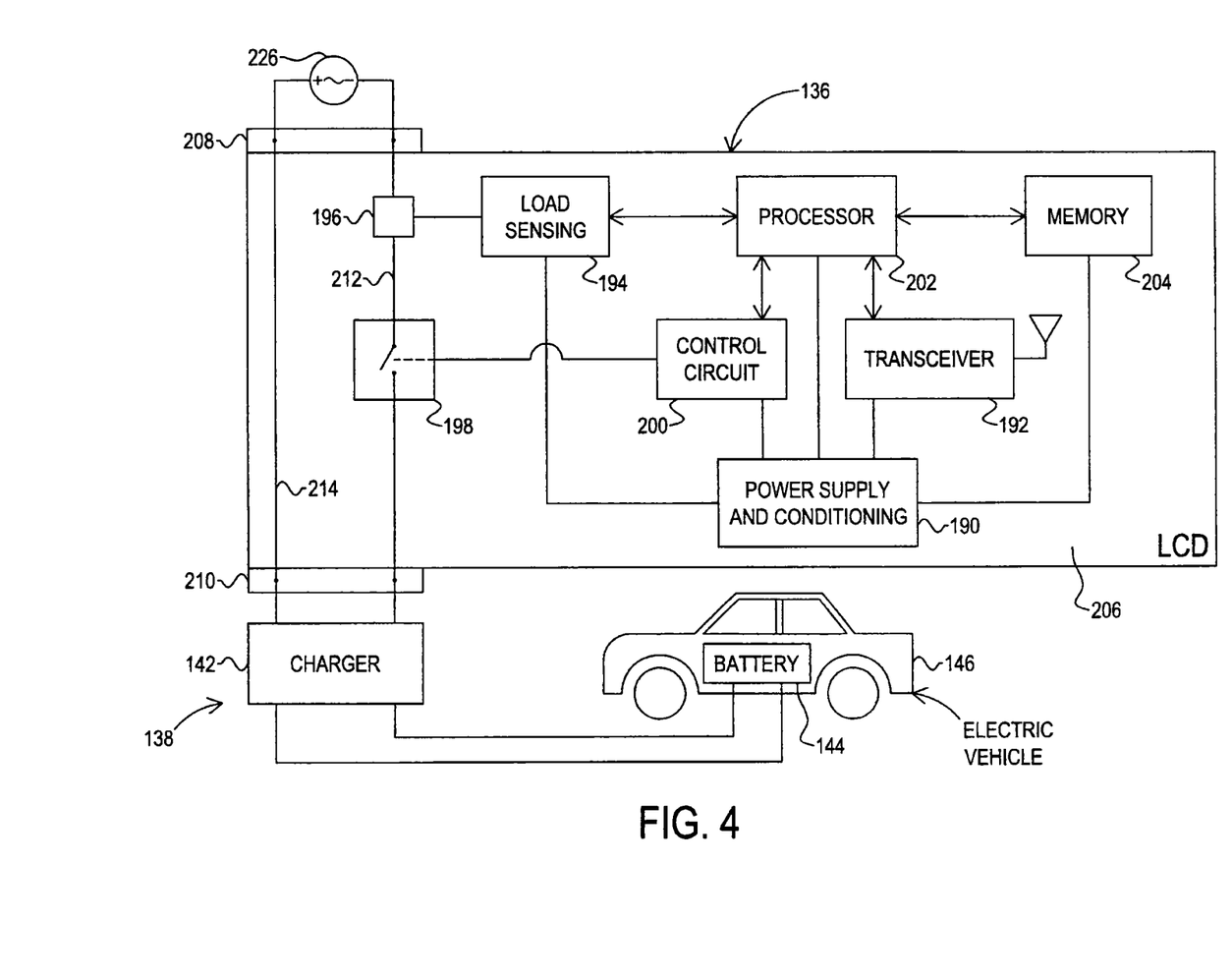
FIG. 4 is a block diagram of a load-control device and system, according to an embodiment of the claimed invention.

Referring to FIG. 4, LCD 136 includes power supply and conditioning circuit 190, LCD transceiver 192, load-sensing circuit 194 with load-sensor 196, switching or control device 198, control circuit 200, processor 202, memory 204, and housing 206. In an embodiment, LCD 136 also may include charging station interface 208 and electric vehicle interface 210.

Power supply and conditioning circuit 190 supplies power to the various electrical circuits and components of LCD 136. In an embodiment, power supply and conditioning circuit 190 is electrically connected to a power supply at premise 120, which is supplied by distribution transformer 114. Power supply and conditioning circuit 160 may include a transformer (not depicted) to reduce an incoming premise voltage, such as 120 VAC to a relatively low voltage, such as 5 VDC, for use by processor 136 and other components of LCD 136.

LCD transceiver 192 is in electrical communication with processor 202, and generally comprises short-haul (local) communications capability for communicating with CDT sensor 134 over local communication network 140. In some cases, transceiver 192 may also comprise long-haul capability for communicating with master station 182 over long-haul communication network 184. As such, transceiver 192 may be configured for any combination of long-haul, short-haul, one-way, or two-way communications.

In one such embodiment, transceiver 192 comprises a combination transmitter and receiver configured for two-way communication over local network 140, and configured for one-way (transmit) communication over long-haul network 184. Alternatively, transceiver 192 may be configured for two-way communication over long-haul network 184.

Load-sensing circuit 194 with load sensor 196 is in electrical communication with processor 202 and senses the absence or presence of load 138, which as described above, may comprise charging station 142 charging electric vehicle battery 144, or in an alternate embodiment, may comprise a compressor of an air-conditioning unit, or other electrically-powered appliance. In addition to sensing, load-sensing circuit 194 with load-sensor 196 may also measure current, voltage, or another electrical parameter of load 138. Load sensing circuit 194 with load sensor 196 is configured to transmit load data to processor 202.

In an embodiment, load sensor 196 comprises a current transformer detecting presence of an electric current in line 212. In another embodiment, load sensor 196 comprises a voltage detector detecting a voltage at line 212, such as a trigger-sense circuit, that samples a voltage at line 212 at a sampling frequency $f_{samp}$. Load sensor 196 may utilize a variety of technologies, including a resistive shunt, a Hall-effect device, or an inductive sensor. In some embodiments, LCD 136 may include more than one load sensor 196 sensing or detecting electrical current or voltage at lines 212, 214, or 216. In yet another embodiment, load sensor 196 is not integral to LCD 136, but comprises a separate device in communication with load 138, thereby detecting the absence or presence of an electrical load drawing power from distribution transformer 114.

In an embodiment, switching device 198 comprises an electrically-operated switch, which in an embodiment comprises a relay, which may be a normally-closed, single-pole, single-throw relay switch as depicted. In other embodiments, switching device 198 may comprise a multi-pole, multi-throw switch or relay, depending on the number of power lines, such as 212 or 214, that are to be controlled. Switching device 198 may also comprise other types of switching devices, including various types of known relays, and switching circuits or modules configured and/or programmed to interrupt a control or power line, such as 212 or 214.

In another embodiment, switching device 198 may comprise a control device 198, rather than an on/off switch or relay. As described further below, in such an embodiment, device 198 in cooperation with control circuit 200 reduces power delivered to a load 138 or battery 144. In such an embodiment, current flow to load 138 may be reduced.

As depicted, switching device 198 is in electrical communication with control circuit 200. In another embodiment, switching device 198 may in direct electrical communication with processor 202, receiving a control signal directly from processor 202.

Control circuit 200 is in electrical communication with switching device 198 and processor 202. Control circuit 200 receives a control signal from processor 202 and controls switch 198 accordingly.

Processor 202 may comprise a microprocessor, microcontroller, microcomputer, or any suitable logic controller capable of performing calculations on measured data, reading from and writing to memory 204, and controlling electrical components such as control circuit 200, load sensing circuit 194 and load sensor 196, and transceiver 192.

Memory 204 may comprise EEPROM or other suitable non-volatile computer readable memory capable of storing software algorithms and data including current, voltage, power, temperature, and other such data. Alternatively, memory 204 may also comprise volatile computer readable memory, or a combination of volatile and non-volatile computer readable memory in certain embodiments. Such embodiments include non-transitory, computer-readable storage mediums storing instructions to be implemented by processor 202 and LCD 136. Memory 204 may also include a database for storing data sensed, measured, received, and so on, by LCD 136.

Housing 206 houses or encloses the various components of LCD 136, though it will be understood that certain components, such as load sensor 196, switching device 198, or other components of LCD 136 may not be enclosed in housing 206.

As described above, and as depicted in FIG. 4, in an embodiment, LCD 136 also may include interface 208 and interface 210. Interface 210 facilitates an electrical connection between LCD 136 and charging station 142, and LCD may also serve as an interface to electric vehicle 146. In such an embodiment, interface 210 may include hardware and software enabling communication between LCD 136 and vehicle 146. LCD.

Charging station 142 comprises an electrical charging station configured to charge a battery 144 of electric vehicle 146. In an embodiment, charging station 142 comprises a single-phase, such as 120 VAC single-phase (Level 1) or three-phase, such as 240 VAC three-phase (Level 2), charging system. Battery 144 may comprise a battery or other energy storage cell or similar energy-storage device for use in an electric vehicle 146.

Referring again to FIG. 2, in general operation, LMES system 130 provides managed electricity service to premises 120. Substation 108 transmits electricity via distribution line 110 to distribution transformer 114 and CDT sensor 134. The voltage of the transmitted electricity is reduced by distribution transformer 114 and distributed via service line network 116 to every premise 120 connected to service line network 116 and distribution transformer 114. This includes premise 120a to 120f, regardless of the presence of an LCD 136 at any particular premise.

In the embodiment of LMES system 130 as depicted, three of seven premises 120 include an LCD 136 controlling a load 138. However, the number of LCDs 136 present in a particular LMES system 130 may be larger or smaller, depending on the adoption rate of electric vehicles and the installation of associated LCDs 136. In the embodiment wherein load 138 comprises a non-vehicle load, such as a compressor of an air-conditioning or other heating, ventilating, or air-conditioning (HVAC) unit, the number of LCDs 136 may depend on the number of LCDs 136 installed on HVAC units.

In a typical existing service network 112, and prior to any of premises 120 obtaining and using a charging station 142 to charge a battery 144 of electric vehicle 146, distribution transformer 114 will be of a sufficient capacity so as to serve the general electrical needs of all premises 120, including during peak electricity use. However, as discussed briefly above, charging one or more electrical vehicles 146 within a particular service network 112 significantly increases the peak power used collectively by the premises 120, and the power supplied through distribution transformer 114. Such use may lead to a malfunction of distribution transformer 114 if it is operated beyond its capacity for extended periods of time.

Similarly, in an embodiment wherein loads 138 comprise compressors of HVAC units, as additional compressors are added and served by a network 112, or during peak usage times, such as during particularly hot weather, peak power used collectively by premises 120 may increase and cause distribution transformer 114 to be operated beyond its capacity.

However, in LMES system 130, CDT 134 senses, detects, or measures an operating characteristic of distribution transformer 114 to determine whether an instantaneous or sustained maximum or upper threshold has been reached. Such an upper threshold may include a maximum internal temperature of distribution threshold 114, a maximum current draw of distribution transformer 114, a maximum power draw of distribution transformer 114, or another operating characteristic or parameter as sensed by sensing circuit 162 and sensor 164. Sensing circuit 162 and/or processor 170 of CDT sensor determine whether distribution transformer 114 has exceeded a threshold and therefore whether the overall load on distribution transformer 114 should be reduced.

If CDT sensor 134 determines that the overall load on distribution transformer 114 should either be held constant or reduced, CDT sensor 134 causes LCDs 136 to cycle loads 138 on and off, thereby reducing the power supplied through distribution transformer 114, and preventing an eventual failure of distribution transformer 114. As described further below, CDT sensor 134 may communicate data indicating the overcapacity situation to master station 108, such that a utility company may schedule eventual replacement of an existing distribution transformer 114 with a larger capacity distribution transformer 114.

In an embodiment, the cycling of loads 138 is performed autonomously as needed, independent of real-time input from outside agents, including an electric utility company.

Figure 5:
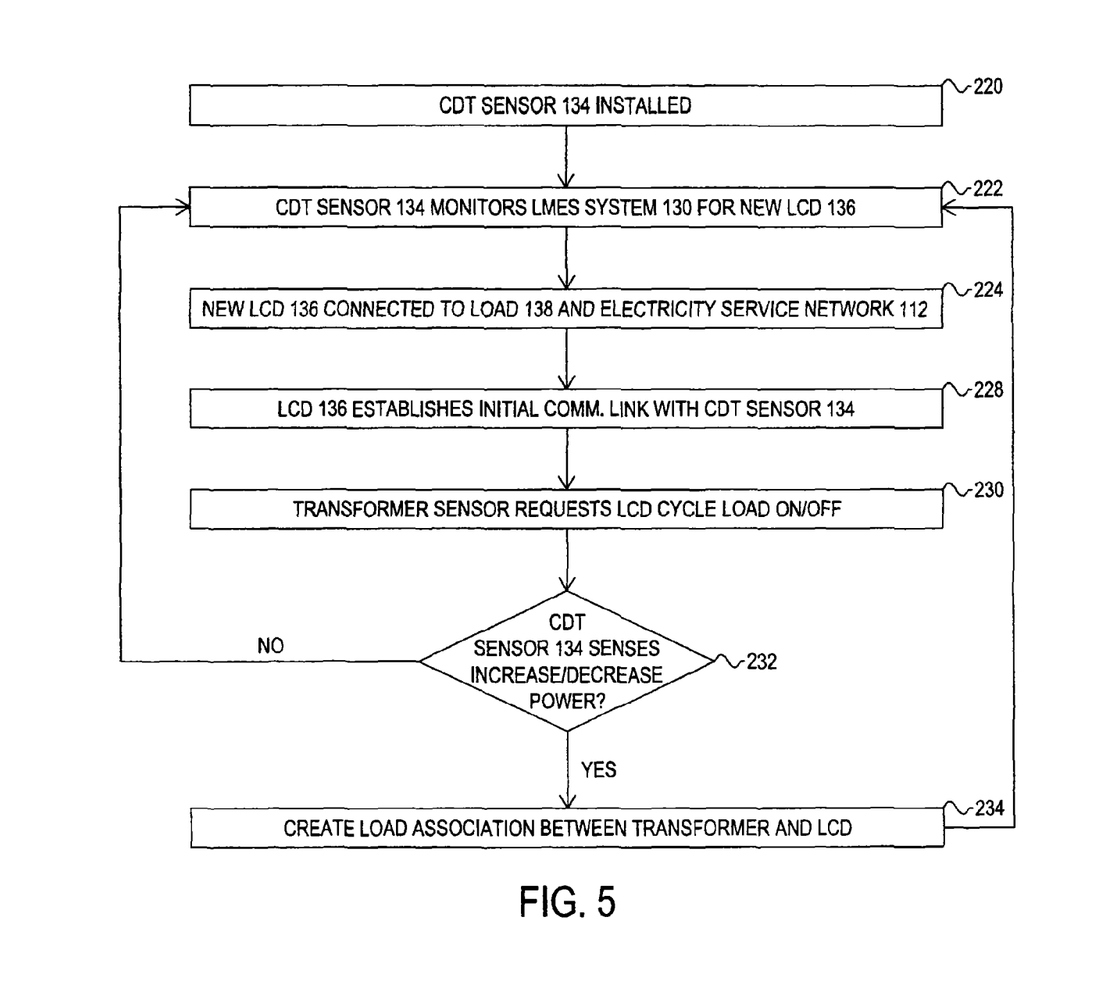
FIG. 5 is a flowchart of a process for connecting the load-control device of FIG. 3 to an electricity distribution and communication network, according to an embodiment of the claimed invention.

Referring also to FIG. 5, a process for an LCD 136 joining LMES system 130 is described and depicted. In an area having multiple CDT sensors 134 and LCDs 136, such as a typical residential neighborhood, a particular CDT sensor 134 may be able to receive communications from multiple LCDs 136. Some of these LCDs 136 "heard" by the "listening" CDT sensor 134 may not be connected to an electricity service network 112 common to the distribution transformer 114 associated with the particular CDT sensor 134, and therefore not supplied by that particular distribution transformer 114. As such, it may be necessary to "associate" each LCD 136 managing a load supplied by a distribution transformer 114 with the CDT sensor 134 of that same supplying distribution transformer 114. Consequently, the process depicted and described in FIG. 5 associates, or matches, LCDs 136 with their supplying distribution transformer 114 and corresponding CDT sensor 134.

At step 220, CDT sensor 134 is installed. As described above with respect to FIG. 2, CDT sensor 134 may be added to an existing distribution transformer 114 serving an existing electricity-service network 112, or alternatively, may be installed as part of a new electricity-service network 112, thereby forming LMES system 130. Once installed and operational, CDT sensor 134 begins sensing and measuring a power characteristic of distribution transformer 114.

At step 222, CDT sensor 134 monitors LMES system 130 for any new LCDs 136 that need to be added to the system. CDT sensor 134 monitors for a new LCD 136 by listening for a data message being transmitted by a new LCD 136 over local communication network 140. The data message may comprise a request to be associated with CDT sensor 134 and its corresponding distribution transformer 114, and to join local communication network 140.

At step 224, a new LCD 136 is connected to a load 138, which in an embodiment comprises charging station 142 and battery 144 of electric vehicle 146, and in an alternate embodiment comprises a non-vehicular electrical appliance.

Referring also to FIG. 4, charging station 142, or other load 138, is electrically connected to an electricity source 226 at premise 120 through LCD 136 via interface 210. Electricity source 226 is electrically connected and supplied by an electricity service network, which may be electricity service network 226. In an embodiment, electricity source 226 may comprise an electrical outlet connected to premise 120 electrical wiring, providing, in an embodiment, 120 VAC. In another embodiment, electricity source 226 may comprise electrical equipment dedicated to providing power to relatively high-current drawing devices, such as load 138, thereby supplying higher-voltage, multi-phase, power, such as 3-phase, 220 VAC/240 VAC power.

LCD 136 is connected to load 138, or electric vehicle 146 via charging station 142. LCD 136, as described above, may also be electrically connected to an electricity source 226 at a power supply and conditioning circuit 190. In an embodiment, charging station 142 is supplied by a 60 Hz, 3-phase, 220/240 VAC source 226, while LCD 136 is supplied by a different source, a 60 Hz, single-phase, 110/120 VAC source 226. In other embodiments, charging station 142 and LCD 136 are powered by electricity sources 226 that may comprise other voltage, frequency, and phase characteristics, including single or multi-phase, 50 or 60 Hz, and voltages ranging from 110V to 240V, and above.

At step 228, LCD 136 establishes an initial communication link with CDT sensor 134 over local communication network 140. As described above with respect to FIGS. 2-4, the communication capability, or ability to transmit and/or receive data, of CDT sensor 134 and LCD 136 may vary. As such, the type of communication between devices CDT sensor 134 and LCD 136 also varies.

In an embodiment, both CDT sensor 134 and LCD 136 are configured to transmit and to receive data over local communication network 140, such that a two-way communication between CDT sensor 134 and LCD may be established.

LCD 136 transmits, or broadcasts, a data message indicating that it is a new LCD that needs to be associated with a CDT sensor 134. One or more CDT sensors 134 within range may receive the data message.

In yet another embodiment, CDT sensor 134 is configured to transmit only over local communication network 140, while LCD 136 is configured only to receive data over local communication network 140. In such an embodiment, LCD 136 may cycle load 138 on and off in a predetermined sequence to indicate to a connected CDT sensor 134 that it is a new LCD that needs to be associated with a CDT sensor 134 commonly connected to its electricity service network 112.

At step 230, after receiving a communication from an LCD 136, CDT sensor 134 requests that the communicating LCD 136 cycle its load on and off. Referring also to FIGS. 3 and 4, in an embodiment, this is accomplished by transceiver 192 of LCD 136 receiving a data message transmitted by transceiver 166 of CDT sensor 134. Processor 202 of LCD 136 then causes control circuit 200 to actuate switching device 198 to a closed, or "on" position, such that load 138 is powered. In an embodiment, processor 202 confirms via load-sensing circuit 194 and load sensor 196 that load 138 is present and powered. This prevents an LCD 136 from mistakenly not being associated with a CDT sensor 134 due to LCD 136 cycling its switching device 198 while load 138 is not connected.

In an alternate embodiment in which device 198 comprises a control device for throttling or varying power to load 138, CDT sensor 134 may request that LCD 136 decrease then increase power delivered to its load 138, rather than switch power completely on and off After a predetermined period of time, processor 202 causes control circuit 200 to open switching device 198, thereby disconnecting power to load 138. The predetermined period of time is at least in part dependent on the sensing technology employed by sensor load sensor 196. A thermal sensor may tend to be relatively slow, such that the period of time may be several minutes. A current or power sensor may be almost real time, such that the period of time may be less than 5 seconds.

In an embodiment, load 138 is cycled on and off only one time. In other embodiments, load 138 may be cycled on and off more than one time. In yet another embodiment, switching device 198 is turned on, and left on, thereby powering load 138.

At step 232, CDT sensor 134 determines whether there was a temporary increase (or decrease in the case of a power decrease followed by a power increase as in the case of a variable control device 198) in power at distribution transformer 114 corresponding to the on-and-off cycling of LCD 136. In another embodiment where LCD 136 is only turned on, not off, CDT sensor 134 determines whether there was an increase in power at a time matching the request for LCD 136 to turn load 136 on. In an embodiment, sensing circuit 162 in conjunction with sensor 164 measures an operating characteristic of distribution transformer 114 (as also described above with respect to FIG. 3). Sensing circuit 162 communicates with processor 170; processor 170 determines whether there was in increase in power. In an embodiment, sensing circuit 162 with sensor 164 measures an incoming current to distribution transformer 114, and transmits that information to processor 170. If an increase in current is sensed, followed by a decrease in current, processor 170 may determine that the increase and subsequent decrease corresponds to the request to cycle LCD on and off. In an embodiment, processor 170 may require that the increase and decrease occur within a predetermined period of time after the request to cycle load 138 is made, or may require that the duration of the increase match an expected duration.

If there was a detected increase in power, as indicated by detection or measurement of any number of operating characteristics of distribution transformer 114, then the distribution transformer 114 associated with the CDT sensor 134 communicating with the LCD likely is supplying the communicating LCD. Further, the detected increase in power provides an indication of the additional load to be expected. Such information may be used not only for local load management, but may also be communicated to a utility for planning purposes.

On the other hand, if no corresponding increase and decrease (or decrease and increase) in power was detected, then the communicating LCD 136 is determined not to be supplied by the distribution transformer 114 associated with the CDT sensor 134 that received the communication, and CDT sensor 134 continues to monitor for communications from other LCDs 136, as described at step 222.

At step 234, if CDT sensor 134 senses the appropriate change at distribution transformer 114, then the communicating LCD 136 and its corresponding load are associated with the receiving CDT sensor 134. In an embodiment, CDT sensor 134 saves data identifying the communication LCD as received in the initial data message sent by LCD 136 in memory 168. Similarly, LCD 136 may save data identifying the associated CDT sensor 134 in its memory 204.

The process of FIG. 5 may be repeated for each new LCD 136 seeking a CDT sensor 134 for association.

Referring to FIG. 2, in an embodiment, each LCD 136 can only be associated with one CDT sensor 134 and distribution transformer 114. However, each CDT sensor 134 and distribution transformer 114 may be associated with several LCDs 136.

Load-managed electricity service (LMES) system 130 is thusly established after one or more LCDs 136 are associated with a CDT sensor 134 and distribution transformer 114.

System 130 then autonomously manages loads 138 by cycling them on and off so as to avoid overburdening distribution transformer 114.

As depicted in the embodiment of FIG. 2, LMES system 130 services seven premises 120, namely, premise 120a to 120g. Premises 120a, 120d, and 120f include LCDs 136a, 136d, and 136f, associated with CDT sensor 134 and distribution transformer 114. Premises 120b, 120c, 120e, and 120g do not include LCDs 136. All premises 120a to 120g are supplied with electricity from distribution transformer 114, and consequently all generally present an electrical load to distribution transformer 114. Those premises 120 having electric vehicles 146 typically present larger loads as compared to those premises 120 without electric vehicles 146.

Figure 6:
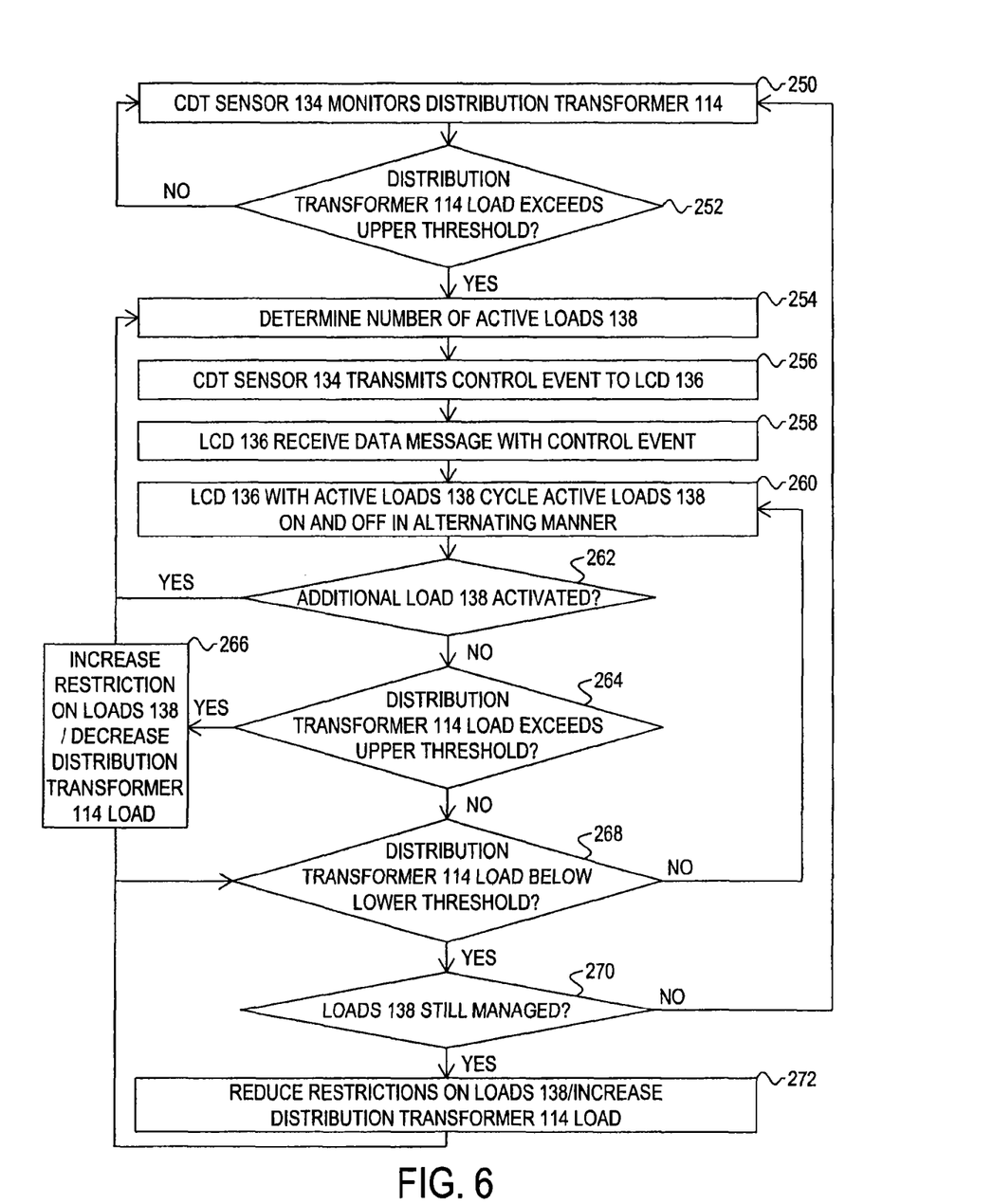
FIG. 6 is a flowchart of a process for managing and controlling electrical loads using multiple load-control devices.

Referring to FIG. 6, a process for monitoring distribution transformer 114 and cycling loads 138 is depicted and described.

At step 250, CDT sensor 134 monitors distribution transformer 114. As described above with respect to FIG. 3, sensing circuit 162 with sensor 164 senses an operating characteristic that is indicative of a power load of distribution transformer 114. Processor 170 receives sensed data from sensing circuit 162, and determines whether the sensed and/or measured operating characteristic, or calculated operating characteristic based on the measured characteristic, such as a calculated overall power load on distribution transformer 114, exceeds the upper threshold. In an embodiment, the upper threshold may comprise a maximum current draw of distribution transformer 114, maximum temperature, or maximum power. The measured operating characteristic or calculated operating characteristic will be referred to generally as the "distribution transformer 114 load" for the sake of convenience and for describing the further steps below, though it will be understood that "distribution transformer 114 load" may refer to an actual power load, or a proxy for the power load.

At step 252, if the distribution transformer 114 load does not exceed the predetermined upper threshold, then CDT sensor 134 continues to monitor distribution transformer 114.

If at step 252, if the distribution transformer 114 load does exceed the predetermined upper threshold, then at step 254, a number of LCDs 136 having active loads 138 is determined. Although premises 120a, 120d, and 120f all have electric vehicles 146, or other loads 138, not all electric vehicles 146 may be getting charged at the time that distribution transformer 114 load exceeds an upper threshold. In an embodiment, only those loads 138 that are active are cycled. Further, it will be understood the cycling loads 138 may refer not only to turning one or more loads 138 on and off, but also may refer to selectively reducing power to one or more loads 138.

Referring also to FIG. 4, to determine which loads 138 are active, each processor 202 of each LCD 136 receives a signal from its load sensing circuit 194 indicating whether charging station 142 is currently charging battery 144. After each LCD 136 determines whether its respective load 138 (in an embodiment, charging station 142 charging battery 144) is active, the number of active loads 138 is determined.

In an embodiment, CDT sensor 134 serves as a central coordinator, receiving status and load data messages from each LCD 136, and directing operation of each LCD 136. In such an embodiment, CDT sensor 134 via its processor 166 determines the number of active loads 138 after receiving data messages from each LCD 136 transmitted over local communication network 140. In such an embodiment, both CDT sensor 134 and LCD 136 are configured for some sort of two-way communication.

In another embodiment, CDT sensor 134 plays a less significant role in the cycling of active loads. In one such embodiment, LCDs 136 communicate with each other regarding their respective statuses and loads, and the number of loads 138 that are active may be determined by one or more LCDs 136. In one such embodiment, CDT sensor 134 senses an overload condition and communicates the condition to one or more LCDs 136. The networked LCDs then cooperatively determine selection and synchronization of LCDs 136 so as to reduce the overall load on distribution transformer 114.

At step 256, CDT sensor 134 transmits a control event data message over local communication network 140 to LCDs 136, commanding LCDs 136 to begin actively cycling loads 138.

At step 258, LCDs 136 receive the data message with control event data.

At step 260, active loads 138 are cycled on and off in an alternating manner so as to reduce the distribution transformer 114 load and to eventually reduce it to a level below the upper threshold. In an alternate embodiment, rather than simply cycle active loads 138 on and off, power supplied by charging stations 142 to loads 138 is reduced. The power reduction may be accomplished in a number of different ways. In one embodiment, LCD 136 restricts or reduces power available to load 138 or charging station 142 via control circuit 200 and control device 198. In another embodiment, LCD 136 via interface 210 communicates with a load 138 or charging station 142 that has the capability to provide a variable power output, instructing charging station 142 to reduce its power output to load 138. In yet another embodiment, LCD 136 communicates with charging station 142 requesting that charging station 142 perform on/off cycling of power to load 138. The overall reduction in power would be commensurate with the power available, and as supplied by, distribution transformer 114.

At step 262, CDT sensor 134 determines whether an additional load 138 is activated. In an embodiment, CDT sensor 134 checks for additional loads by querying LCDs 136; in another embodiment, when an LCD 136 detects that its load 138 has been powered on, or requires power, it transmits a message over local communication network 140 to CDT sensor 134.

In an embodiment, and as depicted, if an additional load 138 needs to be powered during the control event, namely, during the time that LCDs 136 are actively managing their respective loads 138, the additional load 138 will be added automatically, and the duty cycle or allowed run time of the other active loads will be decreased. In such an embodiment, the process reverts to step 254 to re-determine the number of active loads 138, and steps 256 to 262 are repeated.

If at step 262, no additional loads 138 require activation, the process continues to step 264.

At step 264, CDT sensor 134 via sensing circuit 162 and sensor 164 (see FIG. 3 also) determines whether the distribution transformer 114 load has been reduced to below the upper threshold, or limit.

If after initiating an active cycling sequence at step 260 the distribution transformer 114 load is not reduced sufficiently, i.e., below the upper threshold, at step 266, the distribution transformer 114 load is increased. The distribution transformer 114 load may be increased in a number of ways. In an embodiment, the load is increased incrementally by causing the amount of time that any or all of switching devices 198 are kept open to be reduced or by otherwise increasing the power consumed by each charger. This decreases the amount of time that load 138 is deprived of power, and increases the load to distribution transformer 113. This increase in time may be equitable, in that each LCD 136 is allowed to equally decrease the amount of time that it turns off power to load 138, or in other words, the duty cycle of each load 138 is approximately equal.

This modification to the control event may be implemented by CDT sensor 134 transmitting a new data message commanding LCDs 136 to decrease the duty cycle. Such a new data message may include detailed data regarding a percentage decrease, a time decrease, a step decrease, and so on.

At step 268, if distribution transformer 114 load has not exceeded the upper threshold, CDT sensor 134 via sensing circuit 162 and sensor 164 (see FIG. 3 also) determines whether the distribution transformer 114 load has been reduced to below a lower threshold, or limit. If the distribution transformer 114 load is not below the lower threshold, LCDs 136 continue to actively cycle loads 138 at step 260. If, at step 268, distribution transformer 114 load is below a lower threshold, the load on distribution transformer 114 may be increased, assuming that LCDs 136 are still restricting the load to distribution transformer 114 such that there is available load to be added, i.e., the duty cycle is not yet 100% for all loads.

The "lower threshold" refers to some threshold, limit, or level that is below the upper threshold, and serves as an indication that distribution transformer 114 is operating below its maximum capacity. In an embodiment, a lower threshold might comprise a percentage of current, power, temperature, and so on, such as 90% of a maximum rated current draw of distribution transformer 114. Alternatively a lower threshold might comprise a predetermined value, such as an absolute current, power, temperature, and so on.

At step 270, CDT sensor 134 determines whether there are still loads 138 being managed, or controlled. If LCDs 136 are still cycling loads 138 so as to reduce distribution transformer 114 load, the load is increased at step 272, in a manner similar to the load reduction described at step 266. If the load has already been increased to the point that no LCDs 136 are currently managing their respective loads 138, and the distribution transformer load 114 is below the lower threshold, then the process reverts to step 250 wherein CDT sensor 134 continues to monitor distribution transformer 114 until such time as the distribution transformer 114 load must be reduced again.

The active management of loads 138 by LMES system 130 may generally go unnoticed by consumers operating loads 138, including those consumers charging their electric vehicles 146. However, if enough high-power-consuming loads are added to system 130 and to distribution transformer 114, charge times may be increased, and consumers may begin to notice. Therefore, while LMES system 130 could indefinitely continue to protect and preserve the integrity of distribution transformer 114 by managing loads 138, it may become necessary for an electric utility company to eventually replace an existing distribution transformer 114 with a larger-capacity distribution transformer. Therefore, in an embodiment, LMES system 130 and CDT sensor 134 are configured to communicate the load-management situation to a utility for determining whether distribution transformer 114 should be replaced.

Referring to FIG. 2, in an embodiment, CDT sensor 134 is configured to communicate with master station 182 over long-haul network 184. Master station 182 may be located at substation 108, or at another location. In another embodiment, CDT sensor 134 communicates with another receiving agent of the utility company, rather than a master station of a utility.

Alternatively, transceiver 166 may not be configured for long-haul communications, but rather, may utilize utility meter 132, or even a long-haul capable LCD 136, to communicate over long-haul communication network 184. In such an embodiment, transceiver 166 may communicate to a smart meter 132 or to an LCD 136 over local communication network 140.

CDT sensor 134 transmits, or causes to be transmitted, data relating to the management of loads 138. In an embodiment, CDT sensor 134 transmits a data message indicating that LMES system 130 is actively managing loads 138. Depending on the practices of the electric utility, active management of loads 138 may trigger an automatic upgrade of distribution transformer 114. In another embodiment, CDT sensor 134 transmits detailed data regarding the management of loads 138, including distribution transformer 114 loads, individual load 138 data, timing information, and so on.

After receiving this data, a utility company is able to make an informed decision as to whether and when to replace any particular distribution transformer 114, rather than waiting for a disruptive failure of an overburdened distribution transformer 114.

Although the present invention has been described with respect to the various embodiments, it will be understood that numerous insubstantial changes in configuration, arrangement or appearance of the elements of the present invention can be made without departing from the intended scope of the present invention. Accordingly, it is intended that the scope of the present invention be determined by the claims as set forth.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A load-managing electricity service (LMES) system for managing and controlling electrical loads supplied by a common distribution transformer, comprising:
   a communicative distribution transformer (CDT) sensor arranged integral to the common distribution transformer, including:
   a transmitter configured to transmit a load-management data message over a local communication network;
   a sensing circuit configured to sense an operating characteristic of the common distribution transformer supplying a plurality of electrical loads on a common electricity service network, the operating characteristic indicative of a power load of the common distribution transformer;
   a processor in electrical communication with the transmitter and the sensing circuit, the processor configured to determine whether the operating characteristic exceeds an upper threshold; and
   a load-control device (LCD) arranged at the common distribution transformer, wherein the LCD is configured to communicate with the CDT sensor, the LCD including:
   a transceiver configured to receive the load-management data message;
   a load-sensing circuit configured to sense one of the plurality of electrical loads supplied by the common distribution transformer;
   a control device configured to cause a reduction in electricity supplied to the one of the plurality of electrical loads; and
   a processor in electrical communication with the transceiver, the load-sensing circuit and the control device, the processor responsive to the load-management data message to cause the control device to reduce electricity supplied to the one of the plurality of electrical lead loads, thereby decreasing the power load of the common distribution transformer;

wherein the CDT sensor is configured to automatically associate with the LCD; and the LCD is integrated into the LMES system based on a characterization event, wherein the characterization event includes transmitting a power cycling data message to the control device of the LCD upon initial connection of the LCD to one of the plurality of electrical loads supplied by the common distribution transformer to generate a power cycling event and detecting a change in the operating characteristic of the common distribution transformer in response to the power cycling event.

2. The LMES system of claim 1, wherein at least one of the plurality of electrical loads comprises an electric vehicle having a charging station.

3. The LMES system of claim 2, wherein the LCD is integrated into the charging station.

4. The LMES system of claim 3, wherein the charging station outputs a variable supply of electricity and the LCD is configured to cause a reduction in the supply of electricity to the electrical load by causing the charging station to reduce its variable output supply of electricity.

5. The LMES system of claim 1, wherein at least one of the plurality of electrical loads comprises a compressor of an air-conditioning unit.

6. The LMES system of claim 1, wherein the control device configured to cause a reduction in electricity supplied to the one of the plurality of electrical loads comprises a switching device configured to open and close an electrical connection supplying power to the one of the plurality of electrical loads, the switching device removing power from the one of the plurality of electrical loads when in an open position.

7. The LMES system of claim 1, wherein the CDT sensor further comprises a receiver configured to receive data over a long-haul communications network.

8. The LMES system of claim 1, wherein the sensing circuit of the CDT sensor comprises at least one of a current sensor, power sensor, or temperature sensor.

9. The LMES system of claim 1, wherein the operating characteristic comprises at least one of an electrical current, electrical power, or transformer temperature.

10. The LMES system of claim 1, wherein the upper threshold comprises a predetermined electrical current, electrical power, or transformer temperature.

11. A communicative distribution transformer (CDT) sensor for use in a load-managing electricity service (LMES) system for managing and controlling a plurality of electrical loads supplied by a common distribution transformer, including:

a transceiver configured to transmit a load-management data message over a local communication network;

a sensing circuit arranged integral to the common distribution transformer and configured to sense an operating characteristic of a the common distribution transformer supplying the plurality of electrical loads on a common electricity service network, the operating characteristic indicative of a power load of the common distribution transformer; and a processor in electrical communication with the transceiver and the sensing circuit, the processor configured to determine whether the operating characteristic exceeds a threshold;

wherein the processor is configured to cause the transceiver to transmit the load-management data message to a load-control device (LCD) arranged at the common distribution transformer and associated with one of the plurality of electrical loads, thereby causing the LCD to reduce an amount of electricity supplied to the electrical load ; and wherein the CDT sensor is configured to automatically associate with the LCD; and the LCD is integrated into the LMES system based on a characterization event, wherein the characterization event includes transmitting a power cycling data message to the LCD upon initial connection of the LCD to one of the plurality of electrical loads supplied by the common distribution transformer to generate a power cycling event and detecting a change in the operating characteristic of the common distribution transformer in response to the power cycling event.

12. The LMES system of claim 11, wherein the CDT sensor further comprises a receiver configured to receive data over a long-haul communications network.

13. The LMES system of claim 11, wherein the sensing circuit of the CDT sensor comprises at least one of a current sensor, power sensor, or temperature sensor.

14. The LMES system of claim 11, wherein the operating characteristic comprises at least one of an electrical current, electrical power, or transformer temperature.

15. A load-control device (LCD) for use in a load-managing electricity service (LMES) system for managing and controlling electrical loads supplied by a common distribution transformer, the LCD including:

a transceiver configured to receive a load-management data message transmitted from a communicative distribution transformer sensor (CDT) arranged integral to the common distribution transformer;

a load-sensing circuit configured to sense an electrical load receiving power from the common distribution transformer;

a control device arranged at the common distribution transformer and configured to cause a reduction in electricity supplied to the electrical load; and a processor in electrical communication with the transceiver, the load-sensing circuit and the control device, the processor responsive to the load-management data message to cause the control device to reduce electricity supplied to the electrical load, thereby decreasing an overall power load of the common distribution transformer; and wherein the LCD is automatically associated with a CDT sensor and the LCD is integrated into the LMES system based on a characterization event, wherein the characterization event includes transmittal of a power cycling data message by the CDT sensor to the control device of the LCD upon initial connection of the LCD to one of the electrical loads supplied by the common distribution transformer to generate a power cycling event and detecting a change in the operating characteristic of the common distribution transformer in response to the power cycling event.

16. The LCD of claim 15, wherein the LCD is integrated into a charging station for an electric vehicle, and the electrical load comprises the charging station charging the electric vehicle.

17. The LCD of claim 16, wherein the charging station outputs a variable supply of electricity and the LCD is configured to cause a reduction in the supply of electricity to the electrical load by causing the charging station to reduce its variable output supply of electricity.

18. The LCD of claim 15, wherein the electrical load comprises a non-vehicular electrical load.

19. The LCD of claim 15, wherein the control device configured to cause a reduction in electricity supplied to the electrical load comprises a switching device configured to open and close an electrical connection supplying power to the one of the electrical loads, the switching device removing power from the one of the electrical loads when in an open position.

20. The LCD of claim 19, wherein the switching device comprises a relay.

21. The LCD of claim 15, wherein the load-sensing circuit comprises a current sensor.

22. A method of controlling power to an electrical load receiving power from a common distribution transformer communicating with a load-control device (LCD) associated with the electrical load, the method comprising:
sensing by a sensor arranged integral to the common distribution transformer an operating characteristic of the common distribution transformer, the operating characteristic being indicative of a power load of the common distribution transformer;
dynamically adjusting the operating characteristic indicative of the power load of the common distribution transformer in response to an association and integration of a new LCD into a load-managing electricity service (LMES) system based on a characterization event such that an overall power load is increased to account for the addition of the new LCD, and wherein the characterization event includes transmitting a power cycling data message to a control device of the new LCD upon initial connection of the new LCD to one of a plurality of electrical loads supplied by the common distribution transformer to generate a power cycling event and detecting a change in the operating characteristic of the common distribution transformer in response to the power cycling event;
detecting that the operating characteristic indicative of the power load of the common distribution transformer exceeds a threshold;
transmitting a load-management data message over a local network to a first load-control device (LCD) controlling a first electrical load receiving power from the common distribution transformer;
receiving the load-management data message at the first LCD, wherein the first LCD is arranged at the common distribution transformer; and
reducing the amount of power received by the first electrical load in response to the received load-management data message.

23. The method of claim 22, further comprising establishing an initial communication link between the communicative distribution transformer and the first LCD.

24. The method of claim 23, further comprising the first LCD causing a supply of electricity to the first electrical load to change.

25. The method of claim 24, wherein causing a supply of electricity to the first electrical load to change includes causing the first electrical load to power on the first electrical load.

26. The method of claim 25, further comprising sensing the change in the supply of electricity at the communicative distribution transformer.

27. The method of claim 25, further comprising transmitting the load-management data message over the local network to a second load-control device (LCD) controlling a second electrical load also receiving power from the communicative distribution transformer;
receiving the load-management data message at the second LCD; and
reducing the amount of power received by the second electrical load in response to the received load-management data message.

28. The method of claim 27, wherein reducing the amount of power received by the first electrical load in response to the received load-management data message comprises removing power to the first electrical load for a first predetermined period of time, and reducing the amount of power received by the second electrical load in response to the received load-management data message comprises removing power to the second electrical load for a second predetermined period of time and after power has been restored to the first electrical load.

29. The method of claim 22 wherein the first electrical load comprises a vehicle charging station or a compressor of an air-conditioning unit.

30. A load-managing electricity service (LMES) system for managing and controlling electricity-consuming loads supplied by a common common distribution transformer, comprising:
means for sensing an operating characteristic of the common distribution transformer, the operating characteristic being indicative of a power load of the common distribution transformer, wherein the means for sensing an operating characteristic is arranged integral to the common distribution transformer;
means for dynamically adjusting the operating characteristic indicative of the power load of the common distribution transformer in response to an association and integration of a new load-control device (LCD) into the LMES system based on a characterization event such that an overall power load is increased to account for the addition of the new LCD, and wherein the characterization event includes transmitting a power cycling data message to a control device of the new LCD upon initial connection of the new LCD to one of a plurality of electrical loads supplied by the common distribution transformer to generate a power cycling event and detecting a change in the operating characteristic of the common distribution transformer in response to the power cycling event;
means for detecting that the operating characteristic indicative of the power load of the common distribution transformer exceeds a threshold;
means for transmitting a load-management data message over a local network to a LCD controlling an electrical load receiving power from the common distribution transformer;
means for receiving the load-management data message at the LCD; and
means for reducing the amount of power received by the electrical load in response to a received load control event, wherein the means for reducing is arranged at the common distribution transformer.

31. The LMES system of claim 30, further comprising means for causing a supply of electricity to the first electrical load to change.

32. The method of claim 30, further comprising means for sensing the change in the supply of electricity at the communicative distribution transformer.

* * * * *